(12) United States Patent
Vajravel et al.

(10) Patent No.: US 10,114,779 B2
(45) Date of Patent: Oct. 30, 2018

(54) ISOLATING A REDIRECTED USB DEVICE TO A SET OF APPLICATIONS

(71) Applicant: Dell Products L.P., Round Rock, TX (US)

(72) Inventors: Gokul Thiruchengode Vajravel, Bangalore (IN); Sriram Kumar Raju, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 238 days.

(21) Appl. No.: 15/136,550

(22) Filed: Apr. 22, 2016

(65) Prior Publication Data

US 2017/0308492 A1 Oct. 26, 2017

(51) Int. Cl.
| | |
|---|---|
| *G06F 15/16* | (2006.01) |
| *G06F 13/38* | (2006.01) |
| *G06F 13/42* | (2006.01) |
| *G06F 21/78* | (2013.01) |
| *G06F 9/451* | (2018.01) |
| *G06F 21/85* | (2013.01) |

(52) U.S. Cl.
CPC ............ *G06F 13/385* (2013.01); *G06F 9/452* (2018.02); *G06F 13/4282* (2013.01); *G06F 21/78* (2013.01); *G06F 21/85* (2013.01); *G06F 2221/2141* (2013.01)

(58) Field of Classification Search
CPC .............. G06F 13/385; G06F 13/4282; H04L 41/0816; H04L 41/0893
USPC ........................................................ 709/203
See application file for complete search history.

(56) References Cited

U.S. PATENT DOCUMENTS

| | | | | |
|---|---|---|---|---|
| 7,505,455 | B1* | 3/2009 | Goodwin | H04L 12/40052 370/356 |
| 2002/0143921 | A1* | 10/2002 | Stephan | G06F 13/4081 709/223 |
| 2007/0061477 | A1* | 3/2007 | Stoyanov | G06F 9/4411 709/230 |
| 2009/0193524 | A1* | 7/2009 | Shoji | G06F 21/10 726/27 |
| 2012/0158822 | A1* | 6/2012 | Dai | G06F 9/54 709/203 |
| 2012/0173549 | A1* | 7/2012 | Bouguet | G06F 17/30256 707/749 |
| 2013/0246663 | A1* | 9/2013 | Raveendran | G06F 13/4022 710/8 |
| 2013/0254263 | A1* | 9/2013 | Kwon | H04L 29/02 709/203 |
| 2014/0317418 | A1* | 10/2014 | Lin | H04L 63/0471 713/190 |

* cited by examiner

*Primary Examiner* — Tauqir Hussain
(74) *Attorney, Agent, or Firm* — Kirton McConkie; Brian Tucker

(57) ABSTRACT

A redirected USB device can be isolated to a set of applications. A virtual bus driver on the server can be configured to evaluate each IO request packet that is directed towards the redirected USB device to determine whether the IO request packet was originated by an application that is permitted to access the redirected device. If the application is not permitted to access the redirected device, the virtual bus driver can prevent the IO request packet from being routed over the remote session to the device. In contrast, if the application is permitted to access the redirected device, the virtual bus driver can route the IO request packet accordingly.

19 Claims, 9 Drawing Sheets

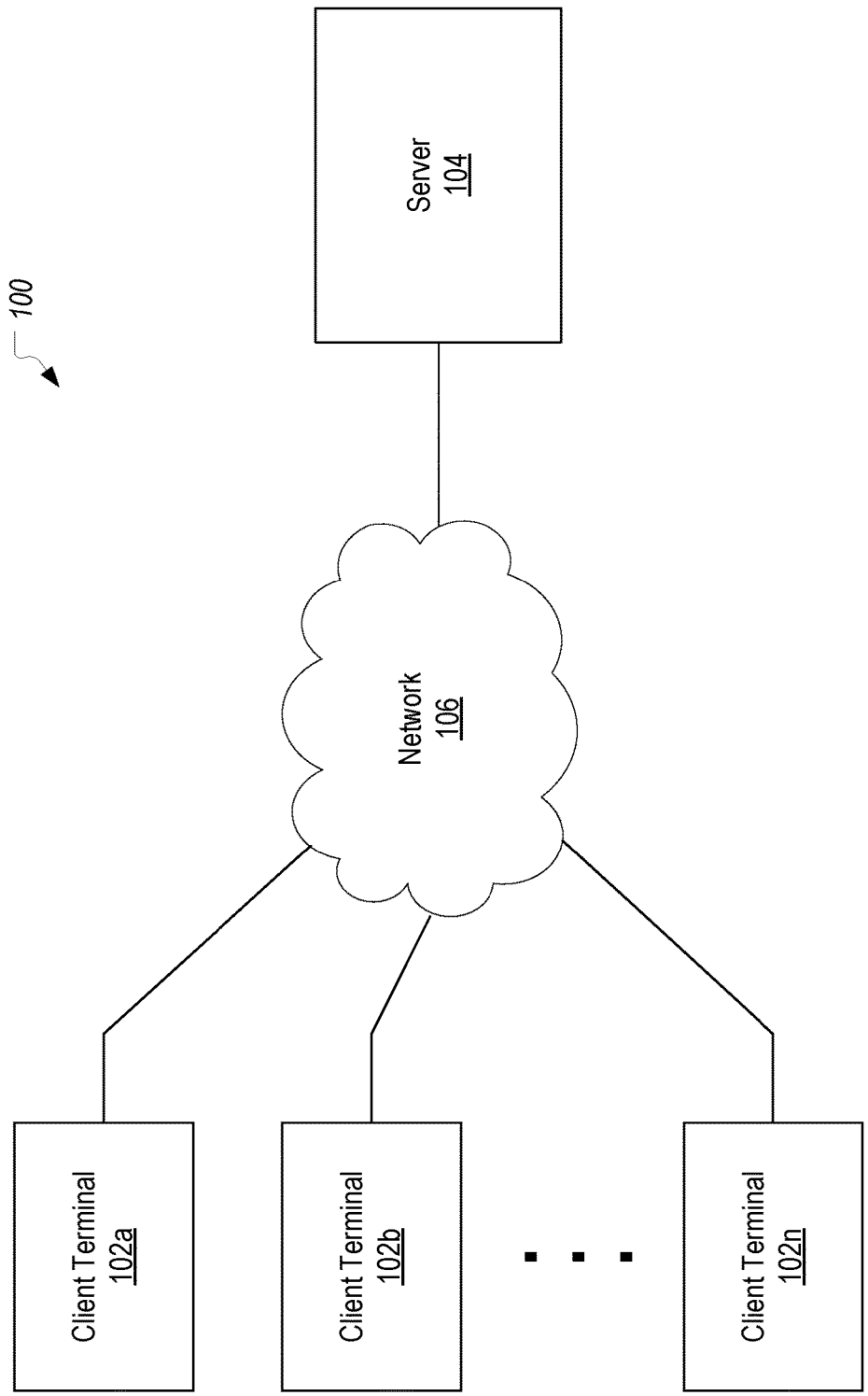

ISOLATING A REDIRECTED USB DEVICE TO A SET OF APPLICATIONS

CROSS-REFERENCE TO RELATED APPLICATIONS

N/A

BACKGROUND

The present invention is generally directed to USB device redirection in a virtual desktop infrastructure (VDI) environment. USB device redirection generally refers to making a USB device that is connected to a client accessible within a virtual desktop as if the USB device had been physically connected to the virtual desktop. In other words, when USB device redirection is implemented, a user can connect a USB device to his or her client terminal and the USB device will function as if it had been connected to the server.

FIGS. 1, 2A and 2B and the following description will provide a general overview of how USB device redirection can be implemented in accordance with some embodiments of the present invention. In FIG. 1, a computing system 100 is depicted as including a number of client terminals 102*a*-102*n* (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands Together, these aspects allow the user at client 102 to locally view and input commands to the desktop and/or application that is running remotely on server 104. From the perspective of the client side, the desktop running on server 104 may represent a virtual desktop environment.

FIG. 2A is a block diagram of a local device virtualization system 200 in accordance with embodiments of the present invention. System 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2A. Server 104 may include an agent 250 and a virtual bus driver 260.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102).

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 240. Device 240 may be accessed from server 104 when client 102 is connected to server 104 through a user session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106. Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a user session through which client 102 is connected to server 104, such as a session number or a session locally unique identifier (LUID). Agent 250 can provide notification of device 240, along with the device information, to virtual bus driver 260. Virtual bus driver 260 (which may be a TCX USB bus driver, or any other bus driver) may be configured to create and store in memory a record corresponding to device 240, the record including at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281a, 281b, . . . , 281n, referred to generally as device object(s) 281), as illustratively shown in FIG. 2A. A device object 281 is a software implementation of a real device 240 or a virtualized (or conceptual) device 290. Different device objects 281 layer over each other to provide the complete functionality. The different device objects 281 are associated with different device drivers (driver(s) 282a, 282b, . . . 282n, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281a stating that a new device has been plugged in. Next, a plug-and-play (PNP) component of the operating system will search for and load the best driver for device 240, which will create another device object 281b that is layered over the previous device object 281a. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a user session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

The Object Manager Namespace (OMN) stores information on symbolic links created for use by operating system 170, including symbolic links for devices and for applications running on server 104. The Object Manager Namespace generally includes several different namespaces for storing symbolic link information for applications and devices. For example, the Object Manager Namespace can include namespaces such as: a "Global" namespace used to store symbolic link information for devices and applications that are shared by all user sessions running on server 104; various "Local" namespaces, each associated with a user session running on server 104, used to store information for applications used by (and restricted to) the associated user session; and a "Device" namespace used to store device object names of devices and virtual devices accessible by server 104. A "Global" namespace may be referred to as a global namespace. A "Local" namespace may be referred to as a local namespace. A "Device" namespace may be referred to as a device namespace.

As described herein, symbolic links can be stored in a global namespace or a local namespace. Symbolic links stored in a global namespace may be available to the entire system (i.e., to all user sessions running on server 104), while symbolic links stored in a local namespace may only be seen and accessed by the session for which they are created. For example, "\\GLOBAL??\c:" may be a symbolic link stored in a global namespace. "\Device\HarddiskVolume1" may be a device object name stored in a device namespace. A symbolic link "\\GLOBAL??\c:" may be pointing to a device object having a device object name of "\Device\HarddiskVolume1". Because "c:" is a symbolic link in the global namespace directory, such a symbolic link may be accessed by the entire system, including all the users logged in through their respective user sessions. A user application can open "\\GLOBAL??\c:" or just "c:" to access the actual device.

In certain operating systems, such as the Windows operating system, the creation of the symbolic link for a device 240 results in an entry being created in a Global namespace of the Object Manager Namespace. Because the symbolic link is created in the Global namespace, the symbolic link can be accessed from any user session running on server 104. As a result, the device 240 associated with the symbolic link can be accessed from any user session on server 104, and/or from any client terminal having an active user session on server 104.

FIG. 2B illustratively shows a block diagram of a computer system 100 providing local device virtualization. As previously described in relation to FIG. 1, system 100 includes client terminals 102a-102n communicating through network 106 with server 104. As described in relation to FIG. 2A above, each device 240a, 240b can be virtualized on server 104 to provide access to the device from a user session on server 104 through a corresponding virtual device 290a, 290b. For example, when device 240a is connected to client terminal 102a, drivers for device 240a may be loaded in operating system 170 of server 104, device 240a may be virtualized on server 104 as virtual device 290a, and a symbolic link to the device 240a may be created in the Object Manager Namespace of operating system 170. Once the symbolic link is created, a user of client terminal 102a may be able to access device 240a through a user session on server 104. Similarly, when device 240b is connected to client terminal 102b, a symbolic link to the device 240b may be created in the Object Manager Namespace of operating system 170 of server 104. Once the symbolic link is created, a user of client terminal 102b may be able to access device 240b through a user session on server 104.

The symbolic links to the devices 240a, 240b are created in a Global namespace of the Object Manager Namespace of operating system 170. As a result, the symbolic links and associated devices can be accessed from and used by any user session running on server 104. For example, as illustratively shown in FIG. 2B, a user of client terminal 102a having a user session on server 104 may access both device 240a as well as virtual device 240b' from the user session. Similarly, a user of client terminal 102b having a user session on server 104 may access both device 240b as well as virtual device 240a' from the user session. Finally, a user of client terminal 102c having a user session on server 104 may access both virtual device 240a' and 240b' from the user session.

Hence, the device virtualization described in relation to FIGS. 2A and 2B provides unrestricted access to devices 240 connected locally to client terminals 102 from any user session on server 104. As such, a redirected device becomes a local device to the server and can be accessed by all the users' sessions connected to that server. For example a printer or a mass storage device, when redirected by one user connected through a session on the server, will show up as a local device and all the users can read/write the mass storage device and print using the printer.

While the unrestricted access enables users of client terminals 102 to share access to and use of devices 240, the device virtualization does not permit a user to restrict access to a device 240. In this respect, the unrestricted device virtualization does not permit secure or private access to device 240. The device virtualization thus presents security and privacy concerns, as a device 240 may be accessed or used by any number of unauthorized users having user sessions on server 104. In order to address these security and privacy concerns, a device virtualization system may require that a device connected through a session only be accessible in that session.

FIG. 3 is a block diagram of a system 300 that can be employed to enforce session level restrictions to limit access to a redirected interface of a USB composite device. The system 300 may include a client 102 in communication with a server 304 over network 106 such as is depicted in FIG. 1. Client 102, including proxy 210, stub driver 220, bus driver 230, and one or more optional device(s) 240, is substantially similar to the client 102 shown in and described in relation to FIG. 2A. Server 304 includes agent 250, virtual bus driver 260, device stack 280 including device objects 281a, 281b, . . . , 281n, device drivers 282a, 282b, . . . , 282n, operating system 170, application 270, and one or more optional virtualized device(s) 290, which function substantially similarly to the corresponding elements of server 104 of FIG. 2A.

Server 304 additionally includes a Device Access Restriction object (DAR object) 180 at the top of device stack 280. A Device Access Restriction driver (DAR driver) 182 creates and attaches DAR object 180 at the top of device stack 280. DAR driver 182 is registered with operating system 170 as the upper filter driver for all selected class(es) of devices for which access restriction is to be made. When DAR driver 182 determines that a device of the class for which the DAR driver is registered is redirected to server 304, the DAR driver creates DAR object 180 and attaches the DAR object at the top of device stack 280.

Server 304 functions substantially similarly to server 104 in terms of loading drivers and device objects for device 240 on server 304. However, as discussed above, DAR driver 182 is registered as the upper filter driver for all the selected class(es) of devices for which access restriction is to be provided. For example, an image device class which includes webcams may be predetermined to be provided with access restriction. Such device classes may be predetermined by a user. When a device of the class, for which DAR driver 182 is registered, is plugged in, the DAR driver will be loaded and its add device routine may be called by operating system 170. For example, in cases where operating system 170 is a Windows system, a plug-and-play (PNP) component of the Windows Kernel will call an add device routine of DAR driver 182. Inside the add device routine, DAR driver 182 receives the physical device object of device stack 280 as an argument, which is used to verify that the device is a device redirected from client 102 using virtual bus driver 260. This verification is done by traversing device stack 280 downward until the bottom of the stack is reached or virtual bus driver 260 is found.

If virtual bus driver 260 is found in device stack 280, this signifies that the device is redirected from client 102 using the virtual bus driver. If the device is found to be redirected from client 102, DAR driver 182 creates DAR object 180 and attaches it (as the top object) onto device stack 280. However, if the bottom of device stack 280 is reached and virtual bus driver 260 is not found, this signifies that the device stack is not a device that is redirected from client 102, and thus no access restriction is to be provided. If the device is not found to be redirected, then DAR object 180 will not be attached on top of the device stack 280.

Since DAR object 180 is attached to the top of device stack 280, all requests for the redirected device are first received by DAR object 180. Thus, DAR object 180 can accept or reject the requests. For example, DAR object 180 can thus restrict a redirected device to be only accessible from the user session.

Although this session isolation provides some security, the user session in which the device remains accessible may still contain some unwanted applications, services, or programs (collectively referred to hereinafter as "applications"). For example, a virus infected browser, unstable or unsupported application, or other malicious application may execute within the user session and therefore have access to the redirected device. As a result, even with session isolation, the redirected device may still be vulnerable to security or policy breaches.

BRIEF SUMMARY

The present invention extends to methods, systems, and computer program products for isolating a redirected USB device to a set of applications. A virtual bus driver on the server can be configured to evaluate each IO request packet that is directed towards the redirected device to determine whether the IO request packet was originated by an application that is permitted to access the redirected device. If the application is not permitted to access the redirected device, the virtual bus driver can prevent the IO request packet from being routed over the remote session to the device. In contrast, if the application is permitted to access the redirected device, the virtual bus driver can route the IO request packet accordingly.

In one embodiment, the present invention is implemented by a virtual bus driver as a method for isolating a redirected USB device to a set of applications. A virtual bus driver executing on a server with which a client terminal has established a remote session can receive a USB request block (URB) that is associated with an IO request packet (IRP) and directed to a USB device that is redirected from the client terminal to the server. The virtual bus driver can evaluate the IRP to determine an application that originated the IRP. The virtual bus driver can also determine whether the application is allowed to access the redirected USB device. Upon determining that the application is not allowed to access the redirected USB device, the virtual bus driver prevents the URB and associated IRP from being routed over the remote session to the redirected USB device.

In another embodiment, the present invention is implemented as a method for isolating a redirected USB device to a set of applications. A remote session can be established at a server and with a client terminal. In response to detecting that a USB device is connected to the client terminal, the USB device can be redirected to the server via a virtual bus driver executing on the server. A set of applications that are allowed to access the redirected USB device can be identified. A first USB request block (URB) that is associated with a first IO request packet (IRP) can be received by the virtual bus driver. The virtual bus driver can determine that the first URB is directed to the redirected USB device. The virtual bus driver can also evaluate the first IRP to determine an application that originated the first IRP and then determine that the application is not included in the set of applications. In response, the virtual bus driver can prevent the first URB and first IRP from being routed over the remote session to the redirected USB device.

In another embodiment, the present invention is implemented as a system for isolating a redirected USB device to a set of applications. The system can include a client-side proxy that is configured to redirect a USB device that is connected to a client terminal over a remote session to a server-side agent, and a virtual bus driver that executes on the server and is configured to selectively route USB request blocks (URBs) over the remote session to thereby prevent a disallowed application from accessing the redirected USB device. The virtual bus driver can selectively route the URBs by: evaluating each URB that is directed to the redirected USB device to identify which application originated the URB; for each evaluated URB, determining whether the application that originated the URB is an allowed application; and for any URB that is originated by an allowed application, routing the URB over the remote session to the redirected USB device, whereas for any URB that is originated by a disallowed application, blocking the URB so that the URB is not routing over the remote session to the redirected USB device.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 1 illustrates an example computing environment in which the present invention can be implemented;

DETAILED DESCRIPTION

In this application, the terms "application" and "process" will be used somewhat interchangeably. From a technical perspective, a process can be defined as an instance of a particular executable while an application may include more than one process. For purposes of the present disclosure, application and process may typically be used synonymously to refer to the main executable process of an application. For example, Microsoft Word (an application) and winword.exe (Word's main executable process) can generally be construed as referring to the same thing.

Also, in this specification, the term device will be used to generally refer to any redirected USB device or interface. Some device virtualization systems allow individual interfaces of a composite device to be redirected. In such cases, the interface may largely be treated as if it were a simple device. Regardless of how the device virtualization system implements device/interface redirection, the present invention may still be employed to isolate a redirected USB device/interface to a set of applications. Accordingly, in the following description and the claims, references to devices should be construed as encompassing interfaces.

Figure 4A:
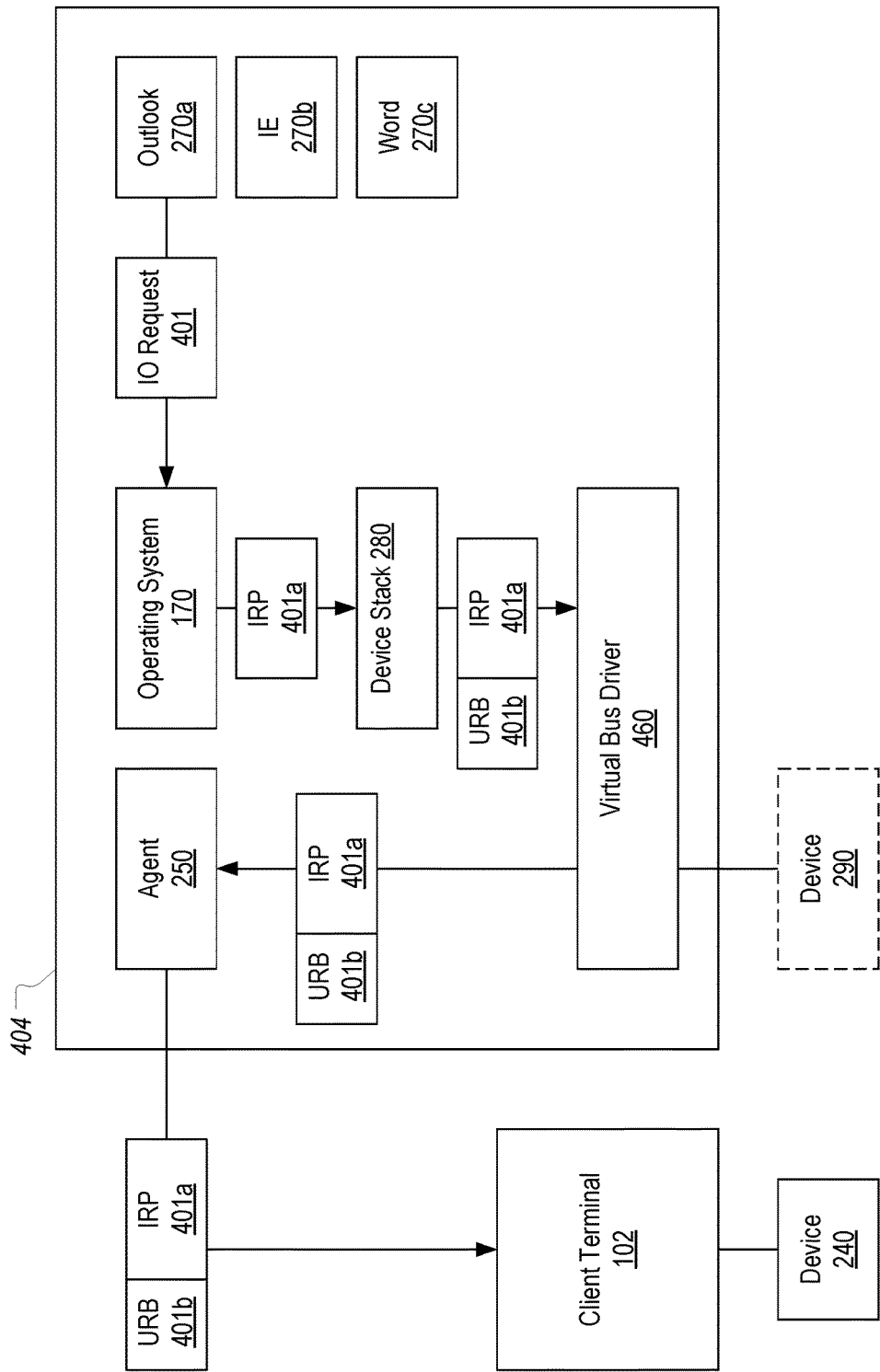
FIGS. 4A and 4B generally illustrate how a virtual bus driver configured in accordance with embodiments of the present invention can allow and block respectively a USB request block based on an application that generated an IO request packet associated with the USB request block.
Figure 4B:
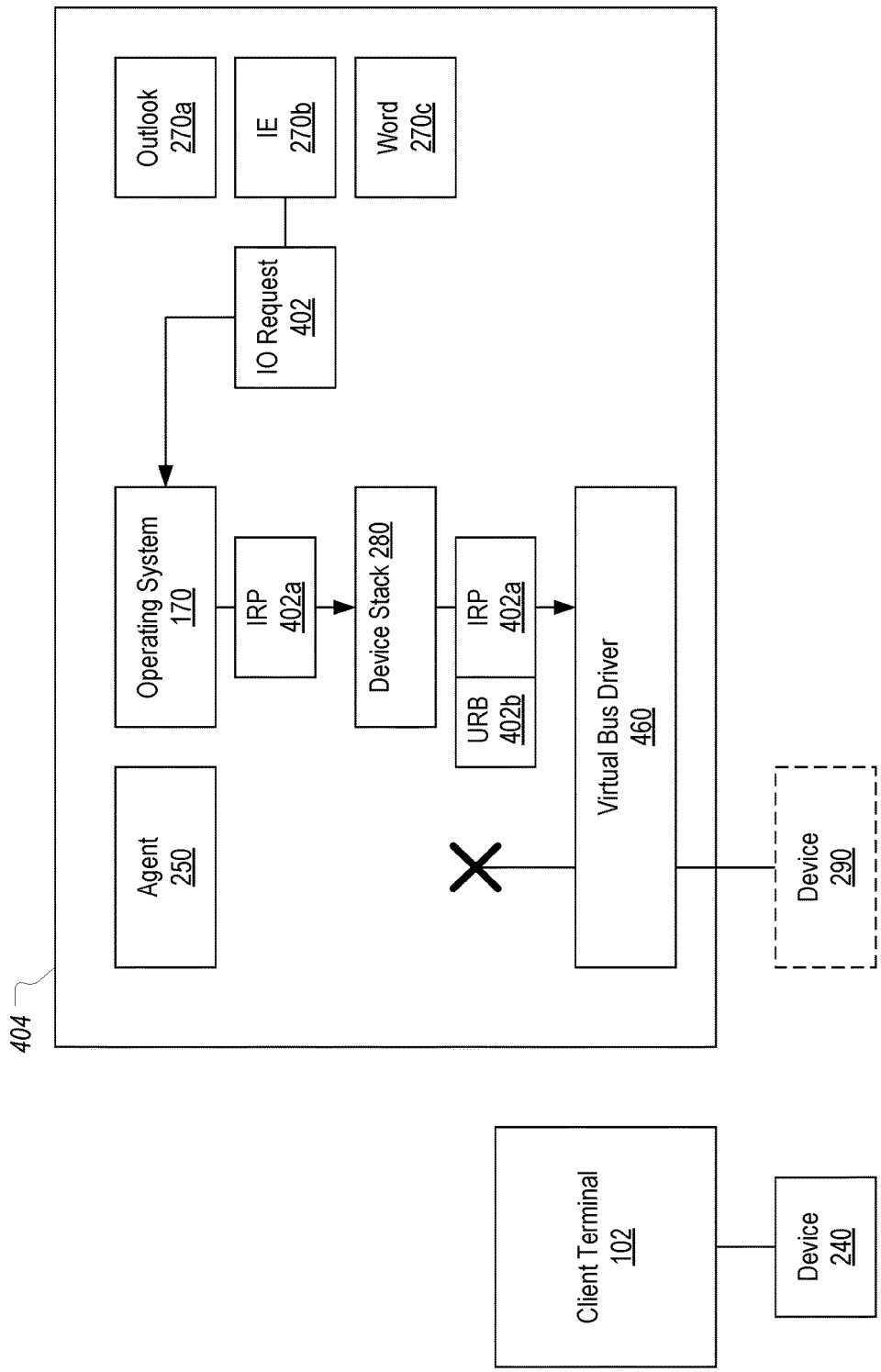

FIGS. 4A and 4B each generally illustrate how a virtual bus driver 460 of a device virtualization system can isolate a redirected USB device to a set of applications by allowing USB request blocks (URBs) to be forwarded on to the redirected device only when the URBs were originated by an approved (or whitelisted) application, or more particularly, only when the IO request packet (IRP) associated with the URB was originated by an approved application. For purposes of the description and the claims, an application may be approved by being positively identified as an approved application or alternatively by not being positively identified as a disapproved application. For simplicity, the remainder of the description will employ an example where applications are positively approved.

In FIGS. 4A and 4B, a server 404 is depicted as being configured in substantially the same manner as servers 104 and 304 described above. Accordingly, server 404 can be configured to allow a device 240 that is coupled to a client terminal 102 to be redirected to server 404 to thereby create a virtual device 290 on server 404. As was described above, when device 240 is redirected, a device stack 280 can be created on server 404 to manage interactions with the redirected device. For simplicity, device stack 280 is depicted in FIGS. 4A and 4B without any objects/drivers. However, at least one object/driver set and possibly many object/driver sets would exist.

Server 404 is also shown as including three applications: Outlook 270a, Internet Explorer 270b, and Word 270c. For purposes of this example, it will be assumed that Outlook and Word are approved to access device 240 while Internet Explorer is not. FIG. 4A depicts the case where Outlook 270a generates an IO request 401 that is directed to device 240 (i.e., to virtual device 290 which would be visible to Outlook on server 404). Operating system 170 (or more specifically the IO manager of the operating system) receives IO request 401 and generates an appropriate IO request packet (IRP) 401a.

Figure 2A:
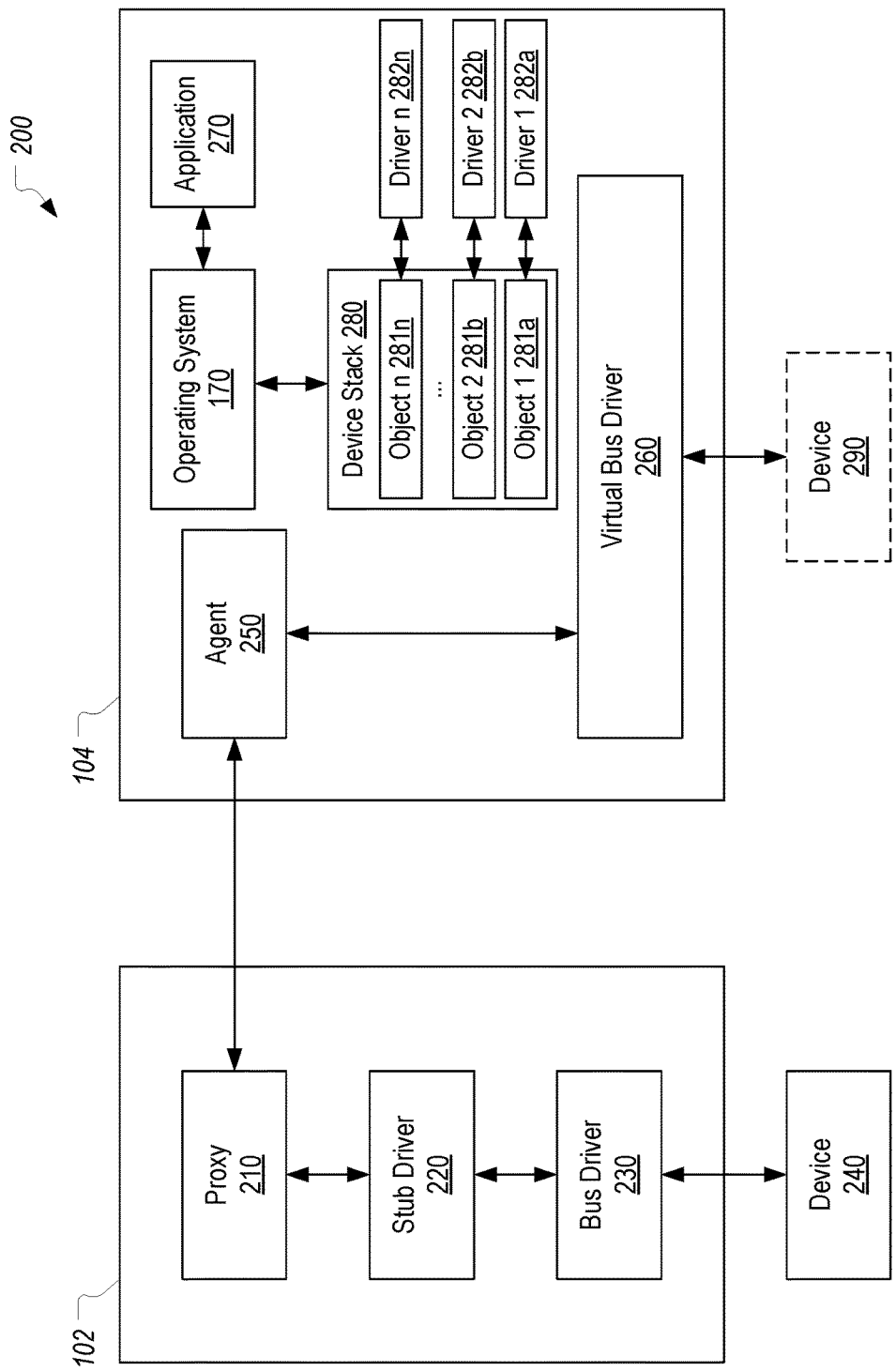
FIG. 2A illustrates how a USB device can be redirected from a client terminal to a server.
Figure 2B:
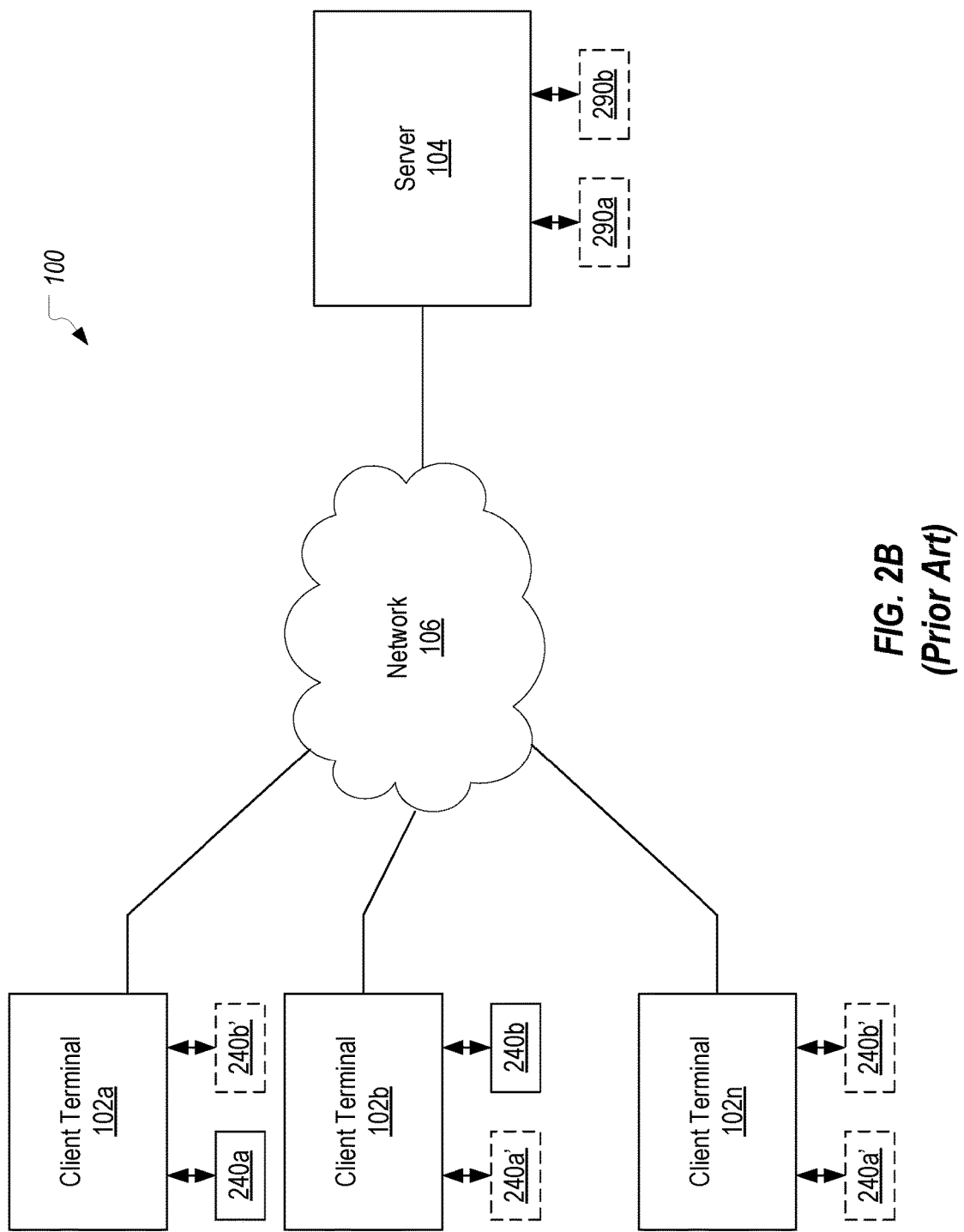
FIG. 2B illustrates how redirecting the USB device to the server can make the device accessible to any remote session established with the server.
Figure 3:
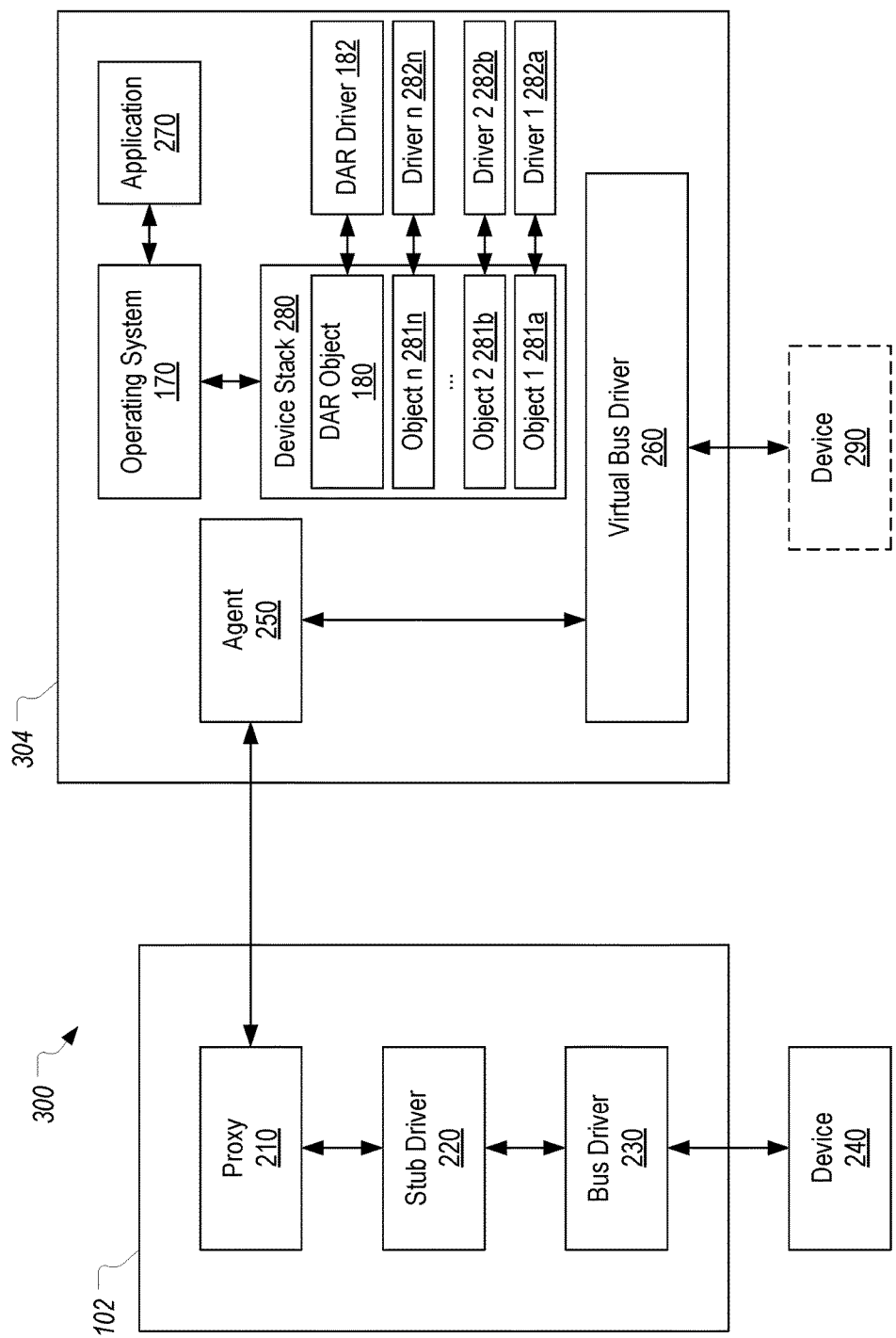
FIG. 3 illustrates how access to a redirected USB device can be restricted to the session over which the redirection occurs.

Because IO request 401 is directed to device 240, operating system 170 will then route IRP 401a to device stack 280 (e.g., by calling IoCallDriver with a pointer to the IRP and a pointer to a device object in device stack 280 (e.g., Object n 281n shown in FIG. 3)). Because device stack 280 pertains to a USB device, the driver(s) in the device stack will create a USB request block (URB) 401b and associate it with IRP 401a. The driver(s) may also perform different types of processing on IRP 401a including blocking, fulfilling, or otherwise completing the processing of the IRP. However, for purposes of this example, it will be assumed that the driver(s) in device stack 280 ultimately pass URB 401b and associated IRP 401a down to virtual bus driver 460.

Virtual bus driver 460 can be configured to snoop IRP 401a to determine whether it originated from an allowed application. As indicated above, Outlook is assumed to be an allowed application. Therefore, virtual bus driver 460 will forward URB 401b and associated IRP 401a to agent 250 which will then route URB 401b/IRP 401a to device 240 for fulfillment of the request.

In contrast, FIG. 4B illustrates a case where Internet Explorer 270b generates an IO request 402 directed to device 240. In the same manner described above, operating system 170 can create IRP 402a for IO request 402 and route IRP 402a to device stack 280. The driver(s) in device stack 280 can create URB 402b and associate it with IRP 402a and then pass URB 402b/IRP 402a down to virtual bus driver 460. Virtual bus driver 460 can evaluate IRP 402a to identify that the IO request originated with Internet Explorer. Because Internet Explorer is not an allowed application, virtual bus driver 460 can prevent URB 402b/IRP 402a from being routed to agent 250. For example, virtual bus driver 460 can send a response up device stack 280 indicating that access to device 240 is denied or that device 240 is not found. In this way, Internet Explorer (and other non-allowed applications) will be blocked from accessing device 240 while Outlook (and other allowed applications) will not.

Figure 5A:
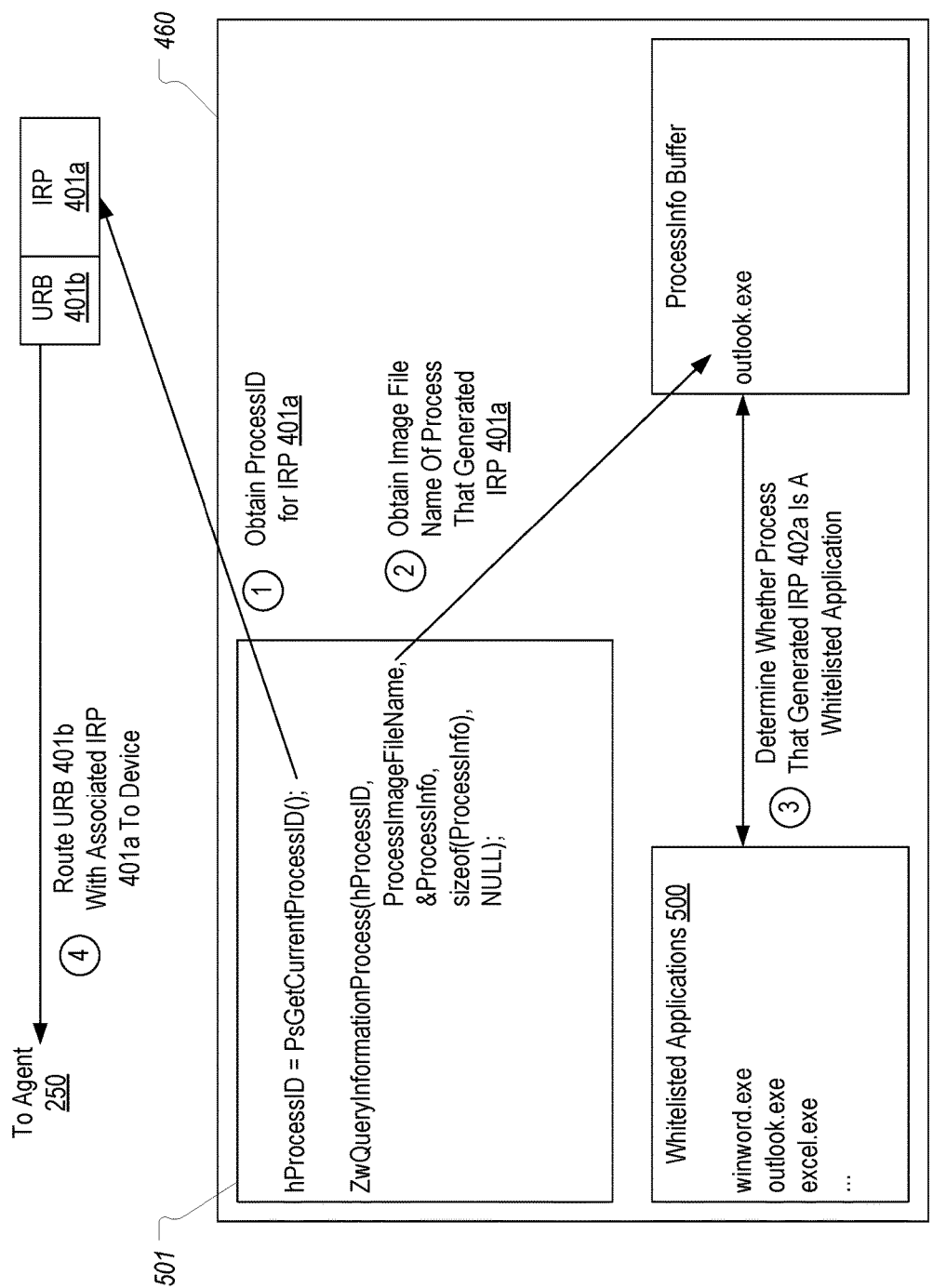
FIGS. 5A and 5B provide a more detailed example of how the virtual bus driver can accomplish selective blocking of USB request blocks.
Figure 5B:
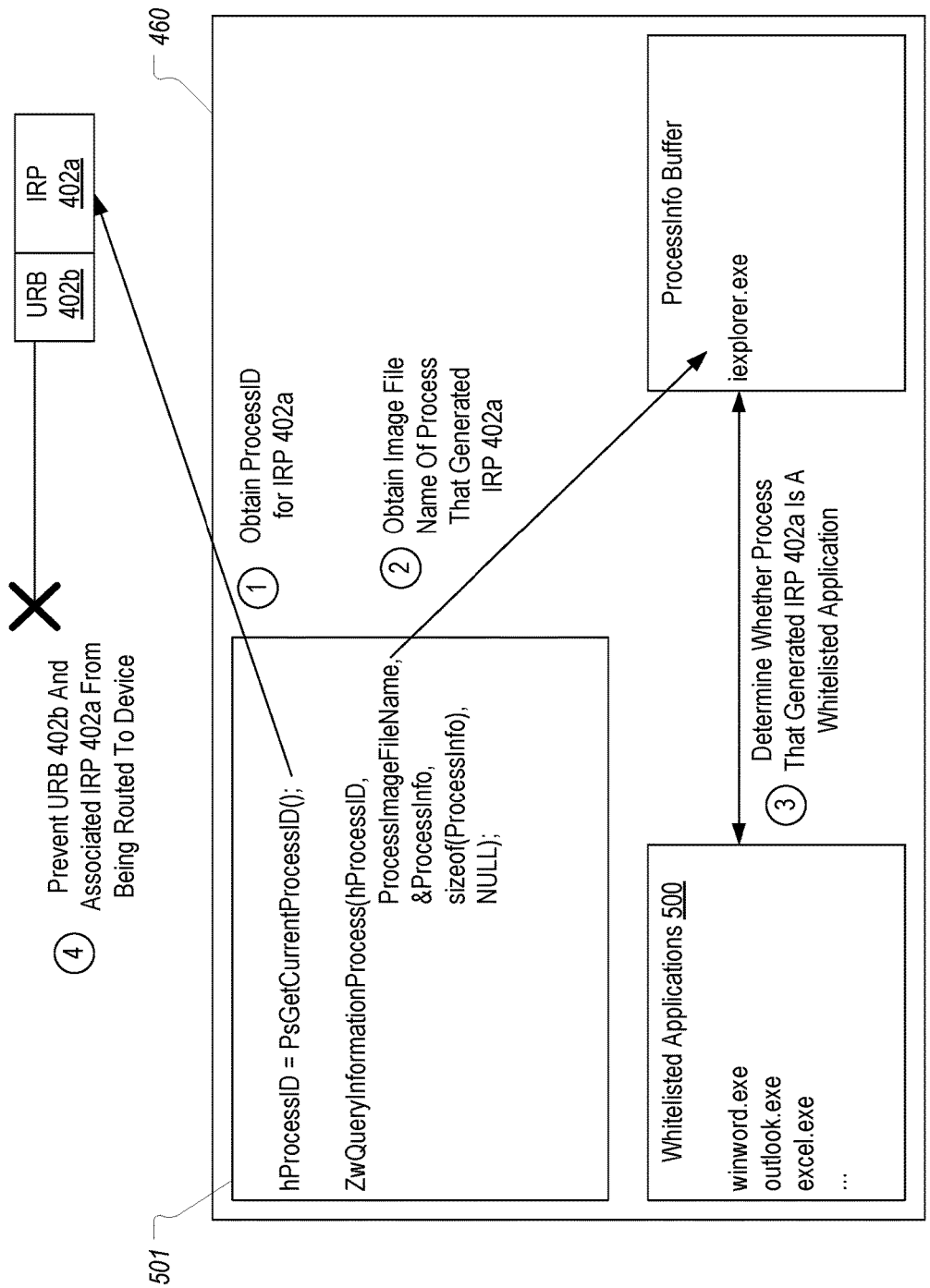

FIGS. 5A and 5B, which correspond to FIGS. 4A and 4B respectively, provide a more detailed example of how virtual bus driver 460 may implement this isolation functionality. Each of FIGS. 5A and 5B depict virtual bus driver 460 as including a list 500 of whitelisted applications and code snippet 501. List 500 is shown as identifying a number of applications (or executable processes) including winword.exe, outlook.exe, and excel.exe. In some embodiments, the contents of list 500 can be controlled by an administrator including, in some cases, by employing a group policy in a directory service such as Active Directory. For example, an Active Directory group policy object could be created that defines which applications should be allowed to access particular devices that are redirected by particular users.

As a more specific example, an administrator could create a group policy object that defines that users pertaining to a developer organizational unit should be allowed to redirect USB mass storage devices and also defines a set of applications that will be allowed to access the redirected USB mass storage devices. In this case, when a developer establishes a remote session with server 404, the group policy object can be processed to populate list 500 with the set of allowed applications. As a result, if the developer redirects a mass storage device to server 404 over the remote session, virtual bus driver 460 can ensure that the redirected mass storage device can only be accessed by the applications specified in list 500.

Also, in some embodiments, the applications that are included in list 500 could be dynamically determined based on a state or condition of the applications. For example, when list 500 is populated, one or more applications could be evaluated to determine whether the application should be included as an allowed application. An example of a condition that may prevent an otherwise trusted application (e.g., winword.exe) from being allowed is if the application does not have a valid digital signature (which may indicate that the application has been infected or otherwise altered). In such implementations, a number of applications can be identified as trusted but will not be added to list 500 as allowed applications unless they can be properly verified (e.g., by validating a digital signature).

Code snippet 501 represents suitable functions that could be employed by virtual bus driver 460 to identify which application generated an IRP (or more specifically, which application generated the IO request that led to the IRP being generated by the OS). The PsGetCurrentProcessID function is a Windows-based function that allows the current thread's process to be identified. For example, while evaluating IRP 401a, virtual bus driver 460 can call the PsGetCurrentProcessID function to obtain the processID associated with IRP 401a. Once this processID is obtained, the ZwQueryInformationProcess function can be employed to retrieve the image file name of the identified process. In particular, by passing a handle to the processID and the parameter ProcessImageFileName, the ZwQueryInformationProcess function will copy the image file name of the process matching the processID to the specified ProcessInfo Buffer. An image file name is the name of the application, or more specifically, is the name and file extension of the executable process such as winword.exe, outlook.exe, or iexplorer.exe.

It is noted that other techniques may be employed to identify which application generated the IRP. For example, in some cases, the processing of an IRP down through device stack 280 could result in a different processID becoming the current processID (e.g., if a filter performs an asynchronous task on the IRP). To avoid such issues, rather than calling PsGetCurrentProcessID, the present invention may employ the value of the Tail.Overlay.Thread field in the IRP to determine which thread created the IRP which could then be employed to determine which process owns the creating thread. In any case, regardless of the technique employed, virtual bus driver 460 can obtain an identification of the application that generated the IRP to allow a comparison to be made to list 500 of allowed applications.

FIG. 5A illustrates how this process can be performed when virtual bus driver 460 evaluates IRP 401a. In a first step, virtual bus driver 460 can obtain the processID of IRP 401a such as by calling PsGetCurrentProcessID during the handling of URB 401b/IRP 401a. Once the processID is obtained, in a second step, virtual bus driver 460 can obtain the image file name of the process such as by calling ZwQueryInformationProcess and passing as input parameters the processID and the ProcessImageFileName value of the PROCESSINFOCLASS enumeration. As a result of this second step, the image file name of the process that generated IRP 401a, which in this case is outlook.exe, will be copied to the ProcessInfo buffer. In a third step, virtual bus driver 460 can compare the obtained image file name (outlook.exe) to list 500 to determine whether the obtained image file name is included in the list. Because outlook.exe is specified in list 500, in a fourth step, virtual bus driver 460 can route URB 401b/IRP 401a to device 240 via agent 250.

FIG. 5B, in contrast, illustrates how this process can be performed when virtual bus driver 460 evaluates IRP 402a. The first and second steps can be performed in the same manner as described with reference to FIG. 5A with the result being that the image file name iexplorer.exe is copied to the ProcessInfo buffer. Then, in the third step, virtual bus driver 460 will compare iexplorer.exe to list 500 and determine that iexplorer.exe is not specified as an allowed application. Therefore, in the fourth step, virtual bus driver 460 can prevent URB 402b/IRP 402a from being routed to agent 250. Instead, virtual bus driver 460 can send a response up device stack 280 indicating that the request cannot be processed for some reason (e.g., access denied, device not found, etc.).

By only allowing whitelisted applications to access a redirected device, virtual bus driver 460 can greatly enhance the security of the redirected device. For example, an administrator can ensure that only trusted applications will be able to access redirected device 240 by only specifying the trusted applications in list 500. Also, by implementing this functionality at virtual bus driver 460, it can be assured that all IRPs directed to the redirected device will be properly evaluated since any IRP destined for a redirected device would have to pass through the virtual bus driver to reach its destination.

Figure 6:
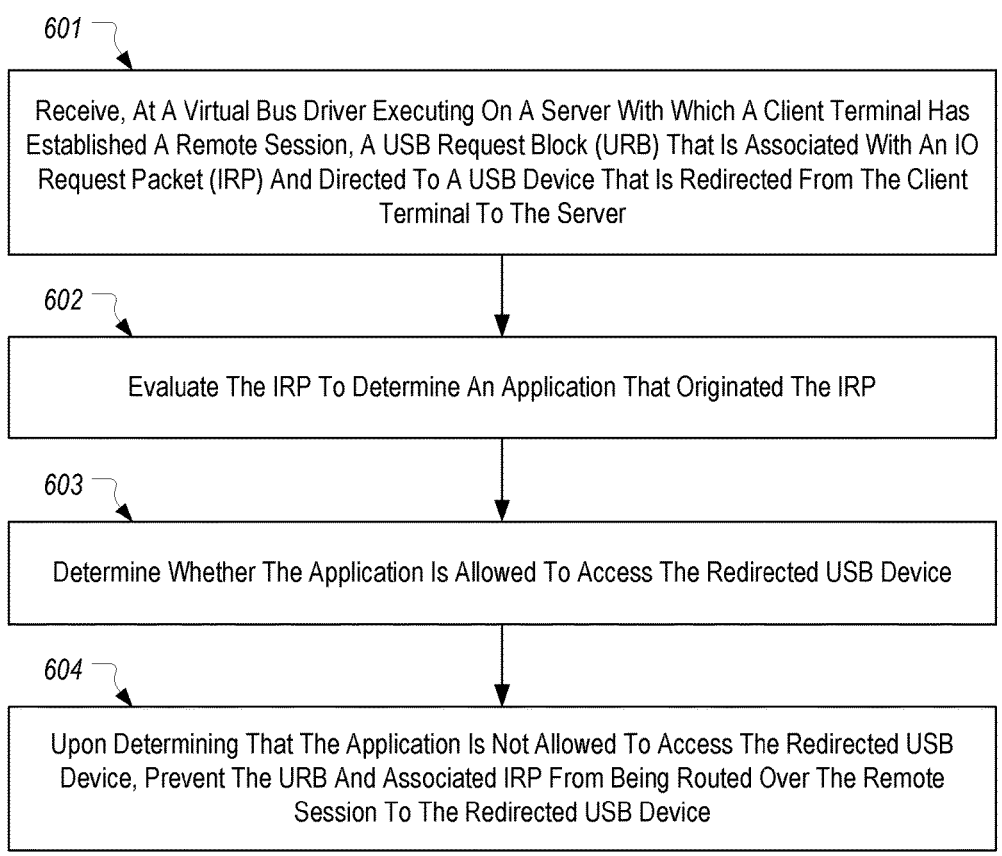
FIG. 6 illustrates a flowchart of an example method for isolating a redirected USB device to a set of applications.

FIG. 6 provides a flowchart of an example method 600 for isolating a redirected USB device to a set of applications. As an example, method 600 can be implemented by virtual bus driver 460.

Method 600 includes an act 601 of receiving, at a virtual bus driver executing on a server with which a client terminal has established a remote session, a USB request block (URB) that is associated with an IO request packet (IRP) and directed to a USB device that is redirected from the client terminal to the server. For example, virtual bus driver 460 can receive URB 402b that is associated with IRP 402a and directed to device 240.

Method 600 includes an act 602 of evaluating the IRP to determine an application that originated the IRP. For example, virtual bus driver 460 can evaluate IRP 402a to determine that Internet Explorer originated IRP 402a.

Method 600 includes an act 603 of determining whether the application is allowed to access the redirected USB device. For example, virtual bus driver 460 can determine that Internet Explorer is not included in list 500.

Method 600 includes an act 604 of, upon determining that the application is not allowed to access the redirected USB device, preventing the URB and associated IRP from being routed over the remote session to the redirected USB device. For example, virtual bus driver 460 can prevent URB 402b and IRP 402a from being routed over the remote session to client terminal 102.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a virtual bus driver, for isolating a redirected USB device to a set of applications, the method comprising:
   receiving, at a virtual bus driver executing on a server with which a client terminal has established a remote session, a first USB request block (URB) that is associated with a first IO request packet (IRP) and directed to a USB device that is redirected from the client terminal to the server;
   evaluating the first IRP to determine an application that originated the first IRP;
   determining whether the application that originated the first IRP is allowed to access the redirected USB device;
   upon determining that the application that originated the first IRP is not allowed to access the redirected USB device, preventing the first URB and the associated first IRP from being routed over the remote session to the redirected USB device;
   receiving, at the virtual bus driver, a second URB that is associated with a second IRP and directed to the redirected USB device;
   evaluating the second IRP to determine an application that originated the second IRP;
   determining whether the application that originated the second IRP is allowed to access the redirected USB device; and
   upon determining that the application that originated the second IRP is allowed to access the redirected USB device, allowing the second URB and the associated second IRP to be routed over the remote session to the redirected USB device.

2. The method of claim 1, wherein evaluating the first or second IRP to determine an application that originated the first or second IRP comprises obtaining a process ID associated with the first or second IRP.

3. The method of claim 2, wherein the process ID is obtained by calling the PsGetCurrentProcessID function.

4. The method of claim 2, wherein the process ID is obtained by identifying a thread that originated the first or second IRP and then identifying a process that owns the thread.

5. The method of claim 1, wherein evaluating the first or second IRP to determine an application that originated the first or second IRP comprises obtaining an image file name of the application.

6. The method of claim 5, wherein the image file name is obtained by employing a process ID of the current process.

7. The method of claim 1, wherein determining whether the application that originated the first or second IRP is allowed to access the redirected USB device comprises comparing the application to a list of allowed applications.

8. The method of claim 7, wherein comparing the application to a list of allowed applications comprises comparing an image file name of the application.

9. The method of claim 1, further comprising:
   creating a list of allowed applications; and
   wherein determining whether the application that originated the first or second IRP is allowed to access the redirected USB device comprises comparing the application to the list of allowed applications.

10. The method of claim 9, wherein the list of allowed applications is created based on a policy applicable to the remote session.

11. The method of claim 9, wherein creating a list of allowed applications comprises evaluating a condition of at least one application.

12. The method of claim 11, wherein the condition comprises a digital signature.

13. The method of claim 1, wherein preventing the first URB and the associated first IRP from being routed over the remote session to the redirected USB device includes passing a response up a device stack indicating that the first IRP cannot be fulfilled.

14. The method of claim 13, wherein the response indicates that the device access is denied or that the device cannot be found.

15. One or more computer storage media storing computer executable instructions which when executed by one or more processors implement a method for isolating a redirected USB device to a set of applications, the method comprising:

establishing, at a server, a remote session with a client terminal;

in response to detecting that a USB device is connected to the client terminal, redirecting the USB device to the server via a virtual bus driver executing on the server;

identifying a set of applications that are allowed to access the redirected USB device;

receiving, at the virtual bus driver, a first USB request block (URB) that is associated with a first TO request packet (IRP);

determining, by the virtual bus driver, that the first URB is directed to the redirected USB device;

evaluating, by the virtual bus driver, the first IRP to determine an application that originated the first IRP;

after determining the application that originated the first IRP, determining, by the virtual bus driver, that the application is not included in the set of applications;

preventing, by the virtual bus driver, the first URB and first IRP from being routed over the remote session to the redirected USB device;

receiving, at the virtual bus driver, a second URB that is associated with a second IRP;

determining that the second URB is directed to the redirected USB device;

evaluating the second IRP to determine an application that originated the second IRP;

determining that the application that originated the second IRP is included in the set of applications, and routing the second URB and second IRP over the remote session to the redirected USB device.

16. The computer storage media of claim 15, wherein identifying a set of applications that are allowed to access the redirected USB device comprises:

identifying a policy that is applicable to the remote session.

17. The computer storage media of claim 15, wherein evaluating each of the first and second IRP comprises obtaining an image file name of the application that originated the IRP.

18. A system for isolating a redirected USB device to a set of applications, the system comprising:

a client-side proxy that is configured to redirect a USB device that is connected to a client terminal over a remote session to a server-side agent;

a virtual bus driver that executes on the server and is configured to selectively route USB request blocks (URBs) over the remote session to thereby prevent a disallowed application from accessing the redirected USB device, the selective routing comprising:

evaluating a first IRP to determine an application that originated the first IRP, determining whether the application that originated the first IRP is allowed to access the redirected USB device;

upon determining that the application that originated the first IRP is not allowed to access the redirected USB device, preventing the first URB and the associated first IRP from being routed over the remote session to the redirected USB device;

receiving a second URB that is associated with a second IRP and directed to the redirected USB device;

evaluating the second IRP to determine an application that originated the second IRP;

determining whether the application that originated the second IRP is allowed to access the redirected USB device; and upon determining that the application that originated the second IRP is allowed to access the redirected USB device, allowing the second URB and the associated second IRP to be routed over the remote session to the redirected USB device.

19. The system of claim 18, wherein evaluating the first or second IRP to determine an application that originated the first or second IRP comprises obtaining a process ID associated with the first or second IRP.

* * * * *